US007340587B2

(12) United States Patent
Kudo

(10) Patent No.: US 7,340,587 B2
(45) Date of Patent: Mar. 4, 2008

(54) INFORMATION PROCESSING APPARATUS, MICROCOMPUTER, AND ELECTRONIC COMPUTER

(75) Inventor: Makoto Kudo, Nagano (JP)

(73) Assignee: Seiko Epson Corporation (JP)

( * ) Notice: Subject to any disclaimer, the term of this patent is extended or adjusted under 35 U.S.C. 154(b) by 237 days.

(21) Appl. No.: 11/149,494

(22) Filed: Jun. 9, 2005

(65) Prior Publication Data
US 2005/0278515 A1 Dec. 15, 2005

(30) Foreign Application Priority Data
Jun. 15, 2004 (JP) ............................. 2004-176681

(51) Int. Cl.
*G06F 9/24* (2006.01)
(52) U.S. Cl. ...................................... 712/200; 712/205
(58) Field of Classification Search ................ 712/235, 712/200, 205
See application file for complete search history.

(56) References Cited

U.S. PATENT DOCUMENTS

| 5,958,038 | A | * | 9/1999 | Agrawal et al. ............... 712/36 |
| 5,961,637 | A | * | 10/1999 | Sturges et al. ............... 712/235 |
| 7,003,649 | B2 | * | 2/2006 | Krishnan .................... 712/213 |

FOREIGN PATENT DOCUMENTS

| CN | 1206145 | 1/1999 |
| JP | 03-189824 | 8/1991 |
| JP | 04-372020 | 12/1992 |
| JP | 05-027971 | 2/1993 |
| JP | 11-024929 | 1/1999 |
| JP | 2003-263313 | 9/2003 |

OTHER PUBLICATIONS

Communication from Chinese Patent Office regarding counterpart application.
Communication from Japanese Patent Office re: related application.

* cited by examiner

*Primary Examiner*—Eric Coleman
(74) *Attorney, Agent, or Firm*—Harness, Dickey & Pierce, P.L.C.

(57) ABSTRACT

An information processing apparatus performing pipeline control includes a first fetch cue fetching a non-branch location instruction, a second fetch cue fetching a branch location instruction, a fetch circuit which carries out arithmetic of a fetch address, fetch it to the first fetch cue or the second fetch cue, and outputs a first fetch cue or a second fetch cue instruction to a decode circuit, a decode circuit which receives and decode an instruction code fetched to the first fetch cue or the second fetch cue, and an execution circuit performing execution of an instruction based on a decoding result, wherein the above-mentioned fetch circuit includes a selective circuit which selects which instruction of the first fetch cue or the second fetch cue to send to the decode circuit based on the execution result of a comparison instruction.

6 Claims, 8 Drawing Sheets

| 310 INSTRUCTION CODE | FETCH | DECODE | EXECUTION |
|---|---|---|---|
| 311 cmp | cmp | | |
| 312 jpeqL1 | jpeq | cmp | |
| 313 add | add | jpeq | cmp |
| and | sub | nop | nop (jpeq COMPLETED UPON DECODING) |
| — | or | sub | nop (INVALID DUE TO BRANCHING) |
| 314 L1:sub | | or | sub (EXECUTION STARTED FROM BRANCH LOCATION) |

INFORMATION PROCESSING APPARATUS, MICROCOMPUTER, AND ELECTRONIC COMPUTER

RELATED APPLICATIONS

This application claims priority to Japanese Patent Application No. 2004-176681 filed Jun. 15, 2004 which is hereby expressly incorporated by reference herein in its entirety.

BACKGROUND

1. Technical Field

The present invention relates to an information processing apparatus, a microcomputer, and electronic equipment.

2. Related Art

In raising performance of a CPU of a pipeline type, it is very important to reduce a necessary clock cycle when carrying out conditional branching while increasing an operating frequency.

On the other hand, in pipeline architecture, when a branch instruction or a loop instruction occurs, a branch location instruction must be started all over again from a fetch. As a result, high-speed branching is carried out in the CPU of a normal five-phase pipeline of Fetch, Decode, Execute, Access, and Write, hence, there is provided an adding machine exclusively for decoding the branch instruction and performing arithmetic of a branch location address in a decode phase. An arrangement in this manner enables the branch location address to have been operated upon completion of decoding, so that a fetch can be carried out next from the branch location.

However, in a case of a conditional branch, since whether or not a branch location is to be fetched or a next instruction is to be fetched is determined after a result of executing a comparison instruction prior to obtaining the branch instruction, when this is done in one clock, there is formed a critical path in which processing time per clock becomes long.

When there was such critical path, an upper limit of the operating frequency became low, hence, there was a problem which made it impossible to increase the operating frequency beyond that limit.

The present invention has been accomplished in view of such problem. It is an object thereof to provide an information processing apparatus, a microcomputer, and electronic equipment which increase the operating frequency without inducing an increase in circuit size and realize a conditional branch of a small clock cycle in an information processing apparatus which employs a pipeline architecture.

SUMMARY

According to the present invention, an information processing apparatus performing pipeline control comprises: a first fetch cue fetching a non-branch location instruction; a second fetch cue fetching a branch location instruction; a fetch circuit performing arithmetic of a fetch address to fetch an instruction code, fetching the first fetch cue or the second fetch cue, outputting a first fetch cue instruction or a second fetch cue instruction to a decoder circuit; the decoder circuit receiving and decoding the instruction code fetched by the first fetch cue or the second fetch cue; and an execution circuit executing an instruction based on a decoding result, wherein the fetch circuit includes a selective circuit selecting which instruction of the first fetch cue or the second fetch cue to send to the decoder circuit based on an execution result of a comparison instruction The comparison instruction is a comparison instruction, which is placed in advance of a conditional branch instruction, for determining a branch condition of a succeeding conditional branch instruction.

It is to be noted that it may be arranged so as to select whether to pass either instruction for the first fetch cue or the second fetch cue based on the execution result of the comparison instruction and information showing that an instruction subject to decoding being decoded parallel to execution of the comparison instruction in pipeline control is a branch instruction.

It may also be arranged such that an address at the time of non-branch is sequentially prefetched for the first fetch cue, while a prefetch is carried out for the second fetch cue as soon as a branch location (the conditional branch instruction is decoded or in the middle of being decoded) address is known.

It is to be noted that it may be configured such that fetching to the first fetch cue which fetches a branch location instruction and fetching to the second fetch cue which fetches the branch location instruction can be carried out in the same clock (memory becomes subject to dual port, too). Further, it may be configured so that either of the instructions can only perform fetching of either instruction in the same clock.

According to the present invention, in the case of a non-branch instruction, a next instruction is prefetched to the first fetch cue, and when a conditional branch instruction arrives, regardless of the branch or the non-branch, the branch location instruction is fetched, then, the selective circuit can select either instruction of the non-branch location (first fetch cue) or the branch location (second fetch cue) based on the execution result of the comparison instruction prior to the branch instruction and pass it to the decoder circuit.

At this point, if it is configured such that selection of fetching either the non-branch location or the branch location is made subsequent to the execution result of the comparison instruction, since a decision on whether to fetch the branch location or the next (address of a non-branch location) is made after obtaining the execution result of the comparison instruction prior to the branch instruction, when this is done in one clock, a critical path which extends processing time per clock will be formed.

Nevertheless, according to the present invention, it is configured such that without referring to the execution result of the comparison instruction prior to fetching, the instructions of both the non-branch location and the branch location are fetched so as to select either instruction based on the execution result of the comparison instruction at the time of passing it to the decoder circuit. This enables time required for processing in one clock to be configured short, thus making it possible to raise the operating frequency.

Further, because additions of the fetch cue and the selective circuit will not be caused as in a case of setting up a branch predictive circuit.

In this way, it is possible to realize conditional branching under a small clock cycle while raising the operating frequency without inducing an increase in circuit size.

In the information processing apparatus according to the present invention, there is provided the decoder circuit determining whether an instruction subject to decoding is a branch instruction or not, and in the case of the branch instruction, a branch location address of the branch instruction is outputted to a fetch circuit. If the instruction subject to decoding is a branch instruction, the fetch circuit fetches the instruction of the branch location address to the second fetch address based on the address of a branch location received. If the instruction subject to decoding is not a branch instruction, arithmetic is performed on a non-branch location address and an instruction for the non-branch location address is fetched to the first fetch cue based on the non-branch location address.

The non-branch location address may be obtained, for example, by incrementing a program counter with an instruction length or a bit width in reading units.

In regard to whether the instruction subject to decoding is a branch instruction or not, the fetch circuit may be designed, for example, such as to determine based on whether the branch location address is received or not, or, after receiving from the decoder circuit information (branch instruction generating information) on whether the instruction subject to decoding is a branch instruction or not, to determine based thereon.

For example, if the instruction subject to decoding is a branch instruction, it can be configured such that the branch location is fetched at the next clock. If the instruction subject to decoding is not a branch instruction, it can be configured such that the non-branch location address is fetched at the next clock.

Even in the case of a configuration of accessing only either the branch instruction or the non-branch instruction with one clock, since arrangements in this manner make it possible to produce a status in which both the branch location and the non-branch location addresses are fetched with a clock after completing execution of the comparison instruction, it is possible, at this point, for the selective circuit to select either the branch location or the non-branch location based on the execution result of the comparison instruction and pass it to the decoder circuit.

In the information processing apparatus of the present invention, there is provided the decoder circuit outputting the branch location address of the branch instruction to the fetch circuit prior to completing decoding the instruction.

According to the present invention, the branch location can be fetched faster, thus enabling processing time of a process to be performed within one clock to be short.

In the information processing apparatus of the present invention, there is provided the fetch circuit fetching simultaneously more than two instructions from consecutive addresses.

For example, in a case of accessing at a 32-bit width in regard to a 16-bit instruction, two consecutive instructions can be accessed simultaneously.

The present invention is a microcomputer comprising an information processing apparatus according to any of the above.

The present invention is electronic equipment according to any of the above comprising: means of receiving input information; and means of outputting a result of processing by the information processing apparatus based on the input information.

According to the present invention, since an information processing apparatus capable of executing at low cost in high speed is built in, it is possible to provide, at low cost, electronic equipment of high function.

BRIEF DESCRIPTION OF THE DRAWINGS

FIG. 2 is a diagram to explain problems when conditional branching occurs;

DETAILED DESCRIPTION

Preferred embodiments of the present invention will be described in detail with reference to the drawings.

Information Processing Apparatus

Figure 1:
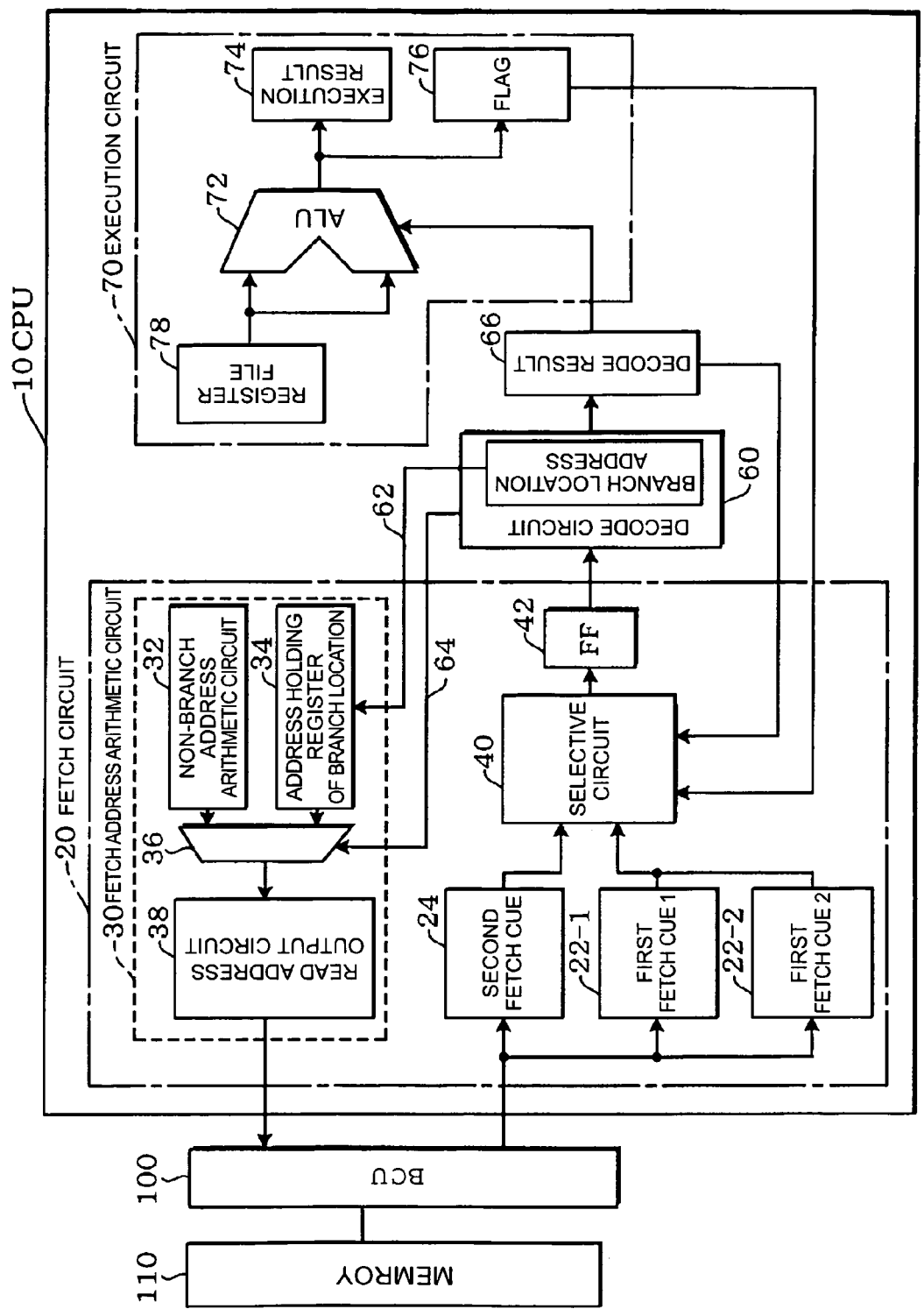
FIG. 1 is a functional block diagram to explain configuration of an information processing apparatus of the present embodiment.

FIG. 1 is a functional block diagram to explain configuration of an information processing apparatus of an embodiment of the invention.

An information processing apparatus 1 of an embodiment of the present invention is an information processing apparatus (for example, microcomputer) performing processing control with a CPU (processing circuit in a broad sense) 10, a BCU (Bus Control Unit) and a memory 110 (ROM (Read Only Memory) and RAM (Random Access Memory).

It is to be noted that the information processing apparatus 1 may include, in addition, various peripheral circuits such as an MMU (Memory Management Unit), a DMAC (Direct Access Memory Controller), an LCD (Liquid Crystal Display) driver or an SIO (Serial Input Output).

The CPU 10 carries out in pipeline control fetching an instruction, decoding an instruction, processing arithmetic, writing into a register and the like according to a program stored in a ROM or a RAM. The CPU 10 is configured such as to handle data of a 32-bit width but to process an instruction code of 16 bits.

The BCU (Bus Control Unit) 100 carries out bus control of various buses such as un-illustrated instruction data bus of 32 bits, an instruction address bus for instruction data access, a data bus of 32 bits, a data address bus for data access, a control bus for a control signal and the like.

And the CPU 10 reads through the bus an instruction to be executed from the memory.

Further, the CPU 10 is constituted by including a fetch circuit 20, a decode circuit 60, an execution circuit 70 and the like.

The fetch circuit 20 includes first fetch cues 22-1 and 22-2, a second fetch cue 24 to fetch a branch location instruction, a fetch address arithmetic circuit 30, and a selective circuit 40.

The fetch address arithmetic circuit 30 performs arithmetic of a fetch address to fetch an instruction code and outputs it to the BCU, including a non-branch address arithmetic circuit 32, a branch location address holding register 34, a selector 36, a read address output circuit 38 and the like.

The non-branch address arithmetic circuit 32 operates as the non-branch address a value obtained by incrementing a value, which is held in an un-illustrated program counter for fetching, in terms of instruction length (or an integral multiple, for example, despite the instruction length of 16 bits, in the case of reading in 32-bit units of bus width, 32 bits).

The branch location address holding register 34, upon receiving a branch location address from the decoder circuit 60, holds it in the branch location address holding register 34.

The selector 36, when receiving branch instruction generating information 64 from the decoder circuit 60, selects a value of the branch location address holding register and outputs it to the read address output circuit 38. In cases other than that, a non-branch address value obtained through arithmetic performed by the non-branch address arithmetic circuit 32 is selected and outputted to the read address output circuit 38.

The read address output circuit 38 outputs an address selected by the selector 36 as an address read from the memory 110 to the BCU 100.

At this point, the fetch address arithmetic circuit 30 may output the branch location address as the read address to the BCU address without waiting for completion of execution of a COMP instruction which determines a branch condition of a conditional branch instruction.

The selective circuit 40, based on the execution result (a decoding result 66, which is a conditional branch instruction, and a flag 76 set up according to a comparison result of the comparison instruction), selects either instruction of the first fetch cues 22-1 and 22-2 or the second fetch cue 24, and outputs it to the decode circuit 60. An outputted instruction is inputted to the decode circuit 60 through a flip-flop (FF) circuit 42.

In this manner, the present embodiment is of configuration such that an MUX (selective circuit 40) is placed immediately before capturing an instruction code into the flip-flop (FF) circuit 42, and that an instruction code (instruction code fetched by the second fetch cue) of the branch location or the instruction code (instruction code prefetched by the second fetch cue) of the non-branch location is selected based on the flag 76 which is obtained as a result of executing the comparison instruction.

The decode circuit 60 is a circuit which receives an instruction code selected by the selective circuit 40 and subjects it to decode processing, outputting a decode result 66 to a specified register and the like. Further, if it is identified as a branch instruction during decoding, a branch location address 62 is outputted to the branch location holding register 34 of the fetch circuit.

The execution circuit 70 includes an arithmetic circuit (ALU) 72 performing arithmetic of data and addresses, a register file 78 and the like, executes the instruction based on an operation content decoded by the decode circuit 60, and sets up an execution result 74 and various flags 76.

The register file 78 may include 16 general purpose registers from general purpose registers R0 to R15, a program counter (PC), a processor status register (PSR), a stack pointer (SP), an arithmetic low register (ALR), an arithmetic high register (AHR) and the like used for the CPU.

According to the present embodiment, there is included a selective circuit 40 which selects the first fetch cue fetching an instruction of a non-branch location, the second fetch cue fetching the instruction of a branch location, and whether to pass to the decoder either instruction of the first fetch cue or the second fetch cue based on the execution result of the comparison instruction. As a result, in the case of the non-branch location instruction, a next instruction is prefetched to the first fetch cue, and when the conditional branch instruction comes, the non-branch location instruction is fetched regardless of the branch or the non-branch, the selective circuit 40 may select either instruction for the non-branch location (the first fetch cue) or for the branch location (the second fetch cue) and pass it to the decoder circuit 60.

It is to be noted that the fetch circuit 20 may be designed such as to fetch simultaneously more than two instructions from consecutive addresses. Namely, for example, when accessing with a data length of 32-bit width with respect to a 16-bit length instruction, it is possible to read two consecutive instructions with one time access. Therefore, the consecutive instructions may be respectively stored in the first fetch cue 22-1 and the second fetch cue 22-2.

FIG. 2 is a diagram to explain problems when a conditional branch occurs.

When branching to a branch location 312 with a conditional branch 312 using an instruction code shown in 310, an instruction "add" 313 next to the conditional branch "jpegL1" 312 instruction becomes a dead fetch to turn into nop (refer to 350). But, thereafter, a branch location "sub" 314 can be fetched and branching can be made with an overhead of one instruction (one clock).

At this point, according to the comparison example (or a general configuration), at the time of executing a cmp instruction, a flag of whether eq or not is calculated. Hence, after checking that flag information, if it is a branch, fetching the branch location will begin.

In this manner, in the case of a conditional branch in the comparison example, it is determined, after obtaining the execution result of a comparison instruction prior to the branch instruction, as to whether the branch location is fetched or the next (non-branch location) instruction is fetched. Therefore, when this is done with one clock, a critical path with a long processing per clock will be formed.

Figure 3:
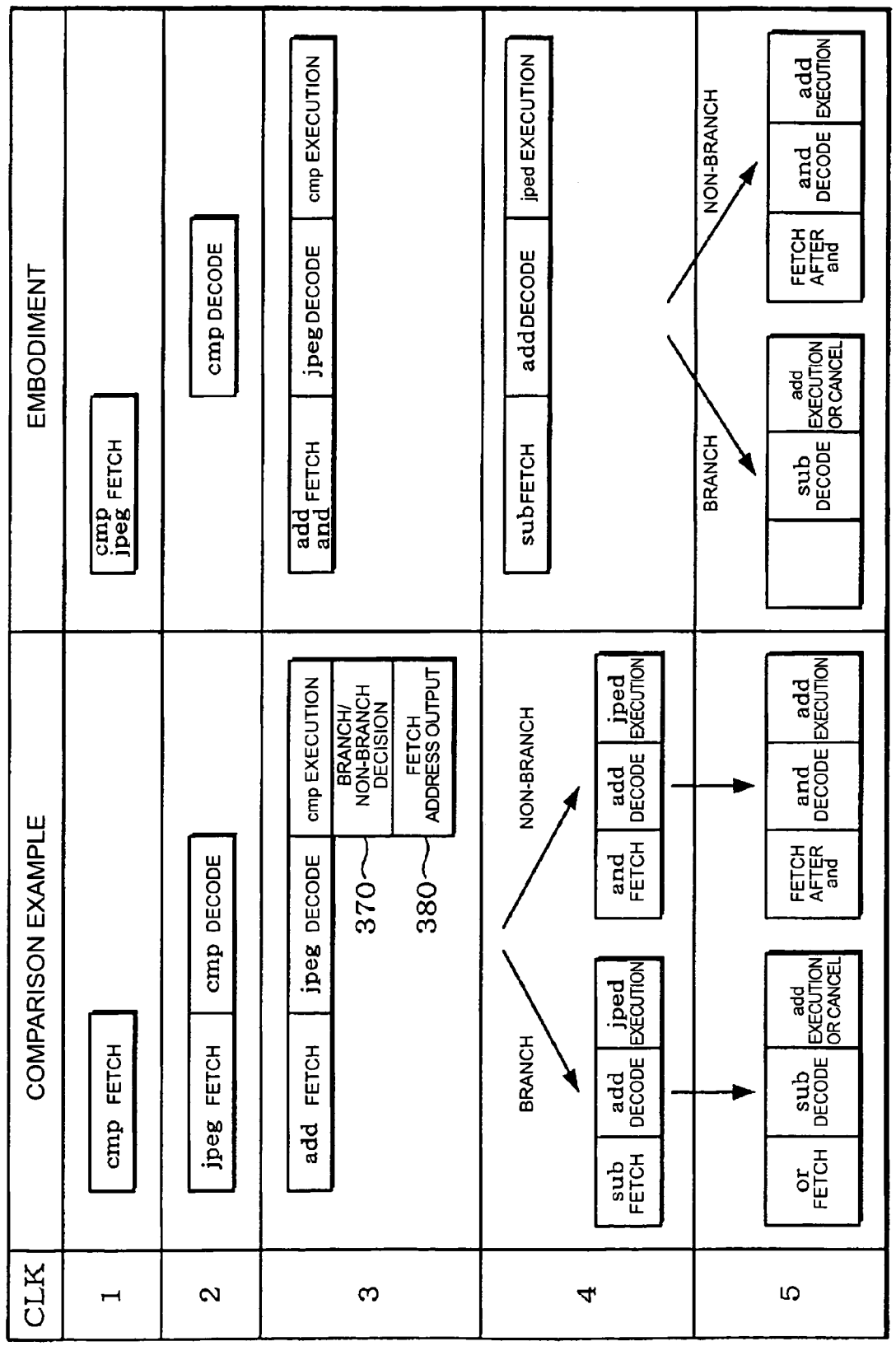
FIG. 3 shows a diagram to show specific comparisons of operation between the present embodiment and comparison examples.

FIG. 3 is a diagram showing specific comparisons of operation between the present embodiment and comparison examples.

The embodiment and operation of comparison examples corresponding to a list of instructions in FIG. 2 will be described as compared to each clock.

First, in the first clock, a fetch of "cmp" is carried out in the comparison example, while in the embodiment, a fetch of two consecutive instructions of "cmp" and [jpeg] is carried out. In this clock, there is not much difference in processing time between the comparison example and the embodiment.

In the next (second) clock, in the comparison example, a fetch of the "jpeg" next to "cmp" is carried out, while, at the same time, a decode of "cmp" is carried out. In the present embodiment, a decode of "cmp" is carried but. (As for the instruction of "jpeg" next to "cmp", it has already been fetched in the previous clock.) In this clock, there is not much difference in processing time between the comparison example and the embodiment.

In the next (third) clock, in the comparison example, an "add" fetch, a "jpeg" decode, execution of "cmp" are performed, and a decision on the branch/the non-branch is made based on the execution result of "cmp" (refer to 370), and a fetch address of branch/non-branch is outputted based on the result of decision (refer to 380). In this manner, it is necessary to carry out within one clock an operation (refer to 370) to make decision on the branch/the non-branch based on the execution result of "cmp" and an operation to output a fetch address of the branch/the non-branch based on the result of decision (refer to 380), so that processing time becomes long (becoming a critical path) (refer to FIG. 4).

On the other hand, in the embodiment, a fetch of two consecutive instructions of "add" and "and", a decode of "jpeg", and execution of "cmp" are carried out.

In the next (fourth) clock, in the case of a branch, a fetch of "sub" of the branch location, a decode of "add", and execution of "jpeg" are carried out in the comparison example. In the case of a non-branch, a fetch of "and" next to "add", a decode of "add", and execution of "jpeg" are carried out. On the other hand, in the present embodiment, a fetch of "sub" of the branch location, a decode of "add", and execution of "jpeg" are carried out. In this clock, there is not much difference in processing time between the comparison example and the embodiment.

And in the next (fifth) clock, in the case of the branch, a fetch of "or" next to "sub", a decode of "sub", and cancel of execution of "add" are carried out in the comparison example. In the case of the non-branch, a fetch of an instruction next to "and", a decode of "and", and execution of "add" are carried out. On the other hand, in the embodiment, in the case of branch, a decode of "sub" which has already been fetched, and cancel of execution of "add" are carried out. In the case of non-branch, a fetch of an instruction next to "and", a decode of "and", and execution of "add" are carried out. In this clock, there is not much difference in processing time between the comparison example and the embodiment.

As apparent from the above, in the third clock, it is necessary for the comparison example to carry out within one clock an operation (refer to 370) to make decision on the branch or the non-branch based on the execution result of "cmp" and an operation to output a fetch address of the branch or the non-branch based on the result of decision (refer to 380), thus forming a critical path to produce a major obstacle in increasing the operating frequency.

Figure 4:
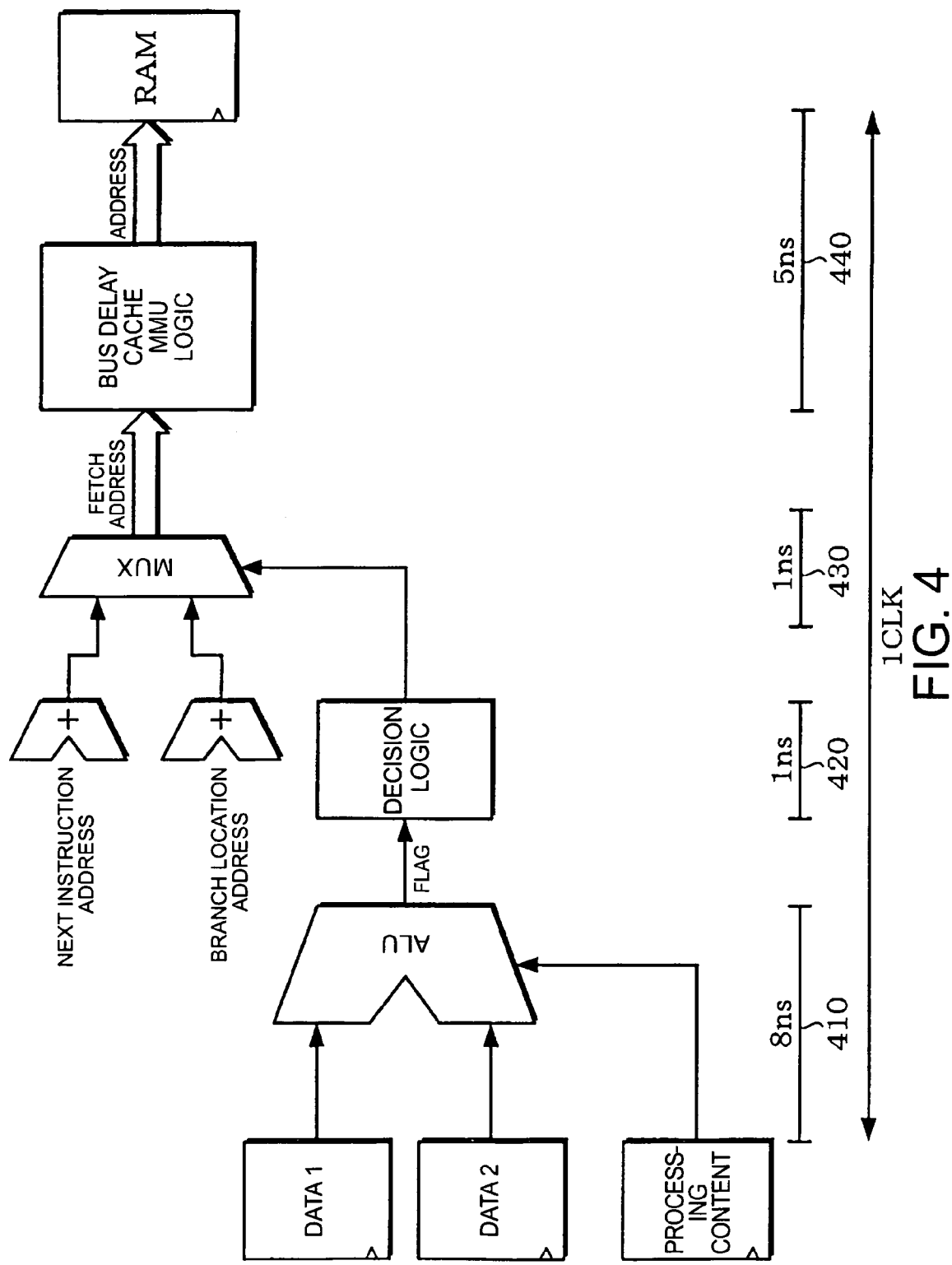
FIG. 4 shows a diagram showing processing time (critical path) of a comparison example.

FIG. 4 is a diagram showing processing time (critical path) of the comparison example of the third clock.

410 refers to a step in which the cmp instruction is executed with its result being stored in the flag register. It takes about 8 nS (nano-sec).

420 refers to a step in which a decision is made on whether to fetch the next instruction or the next branch location instruction based on a content of the flag register and a control signal is generated. It takes about 1 nS (nano-sec).

430 refers to a step for selecting an address of the next instruction or an address of the next branch location instruction, as a fetch address, based on the control signal. It takes about 1 nS (nano-sec).

440 is a step for the fetch address to reach the memory (RAM and the like). It takes about 5 nS (nano-sec) because of a bus delay as well as going through a cache and an MMU logic on the way.

In this manner, since there is a critical path of 15 nS (nano-sec) per clock in the comparison example, 67 MHz is the upper limit of the operating frequency.

Figure 5:
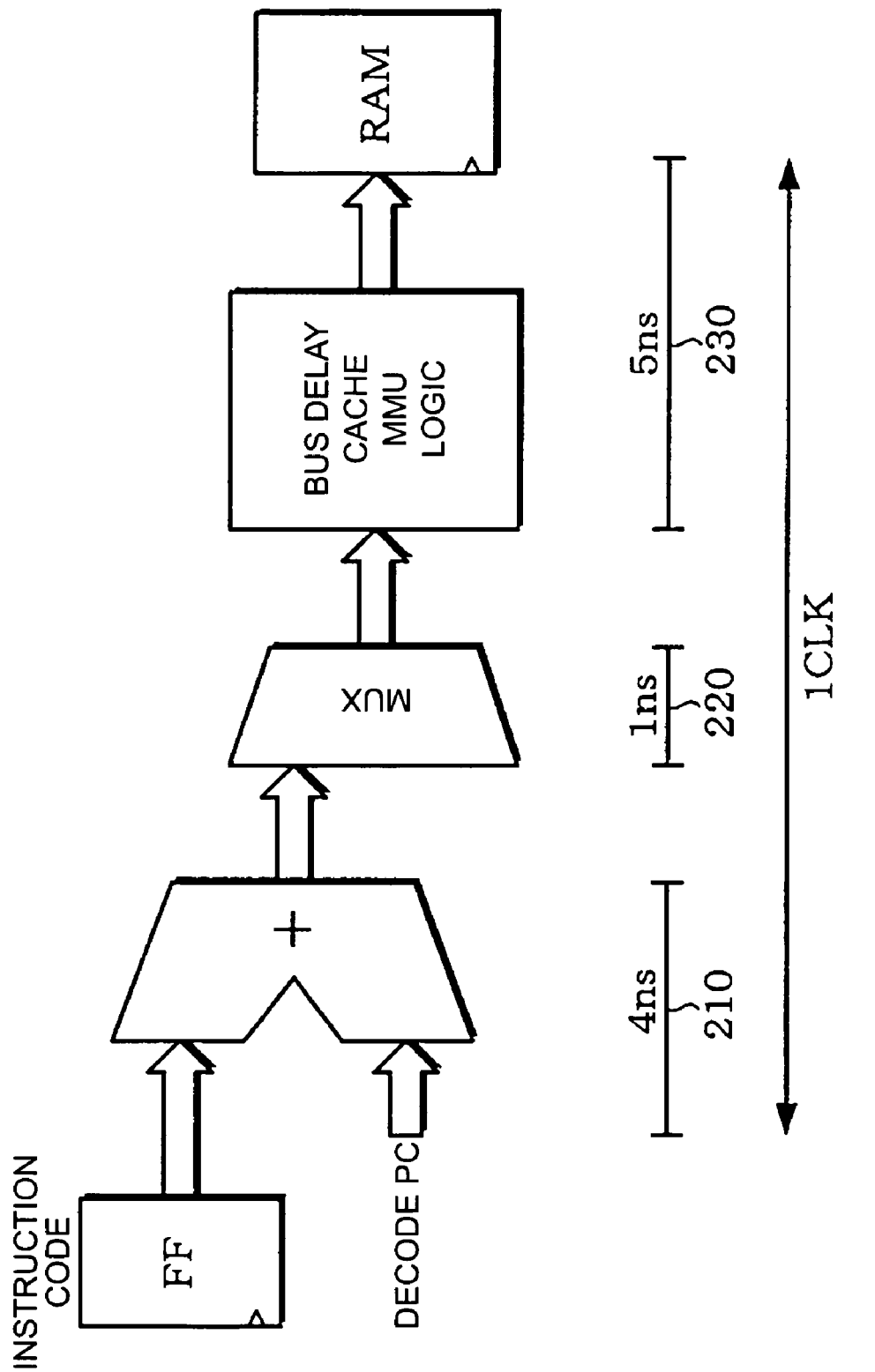
FIG. 5 shows a diagram to show processing time of the present embodiment of the third clock.

FIG. 5 is a diagram showing processing time of the present embodiment at the third clock.

210 is a step in which a jpeg instruction is decoded and a branch location address outputted from the decode circuit is held in the branch location address holding register, and it takes about 4 nS (nano-sec).

220 is a step in which the selector 36 receives a branch instruction generating information 64 from the decode circuit 60 and selects a value of the branch location address holding register, and it takes about 4 nS (nano-sec).

230 is a step for the fetch address to reach the memory (RAM and the like) It takes about 5 nS (nano-sec) because of a bus delay as well as going through the cache and the MMU logic on the way.

In this manner, since 10 nS (nano-sec) per clock is sufficient in the present embodiment, the operating frequency may be increased to 100 MHz.

Microcomputer

Figure 6:
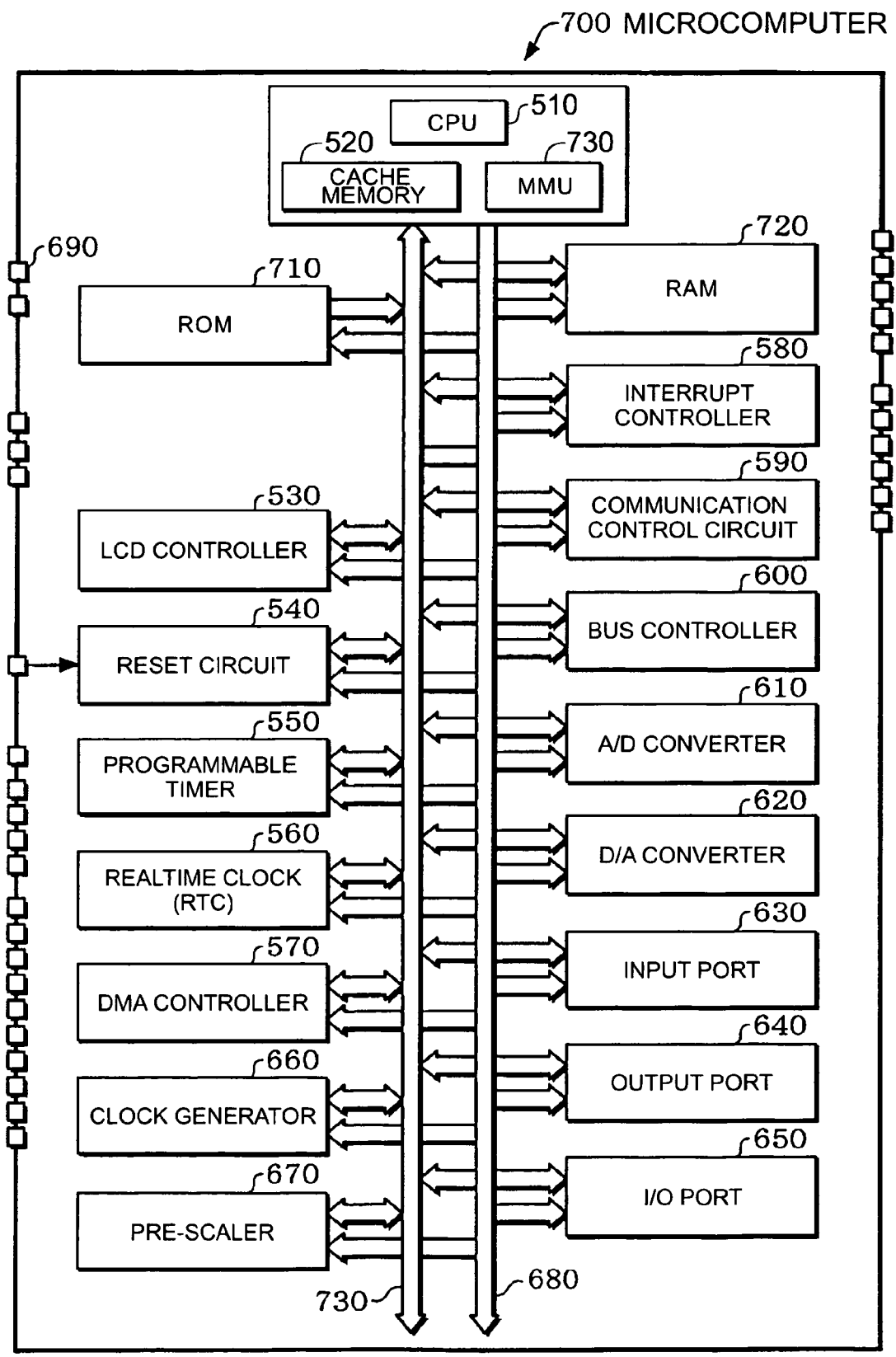
FIG. 6 shows an example of a hardware block diagram of a micro computer of the present embodiment.

FIG. 6 is an example of a hardware block diagram of a microcomputer of the present embodiment.

The present microcomputer 700 includes a CPU 510, a cache memory 520, an LCD controller 530, a reset circuit 540, a programmable timer 550, a real time clock (RTC) 560, DRAM controller/bus I/F 570, an interrupt controller 580, a serial interface 590, a bus controller 600, an A/D converter 610, a D/A converter 620, an input port 630, an output port 640, an I/O port 650, a clock generator 660, a prescaler 670 as well as a general purpose bus 680, an exclusive bus 30 and the like, various pins 690 and the like connecting them.

The CPU 510, for example, is of configuration described in FIG. 1.

Electronic Equipment

Figure 7:
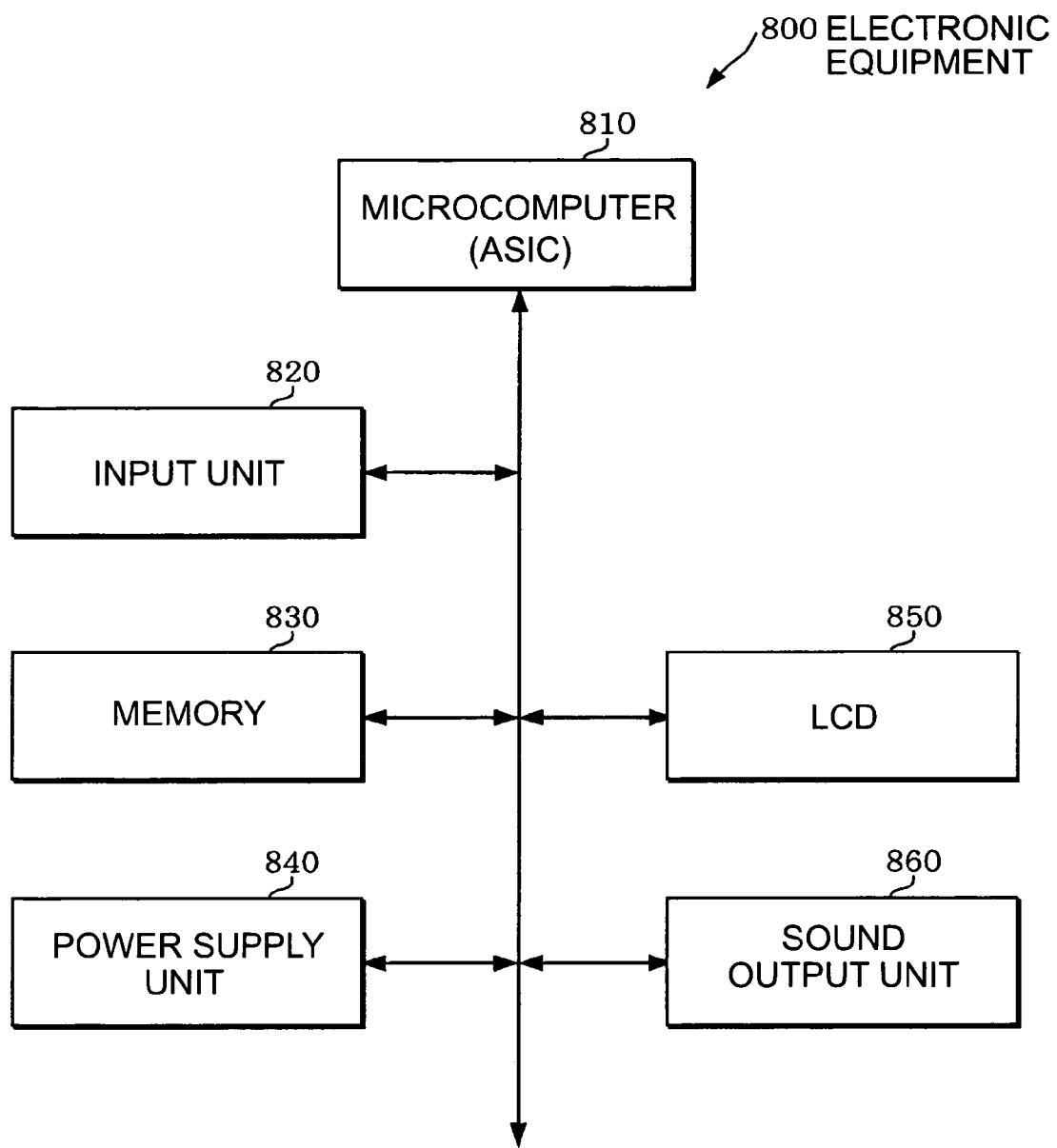
FIG. 7 is an example of a block diagram of electronic equipment including a microcomputer.

An example of a block diagram of electronic equipment of the present embodiment is shown in FIG. 7. Present electronic equipment 800 includes a microcomputer (or ASIC) 810, an input unit 820, a memory 830, a power supply unit 840, an LCD 850, and a sound output unit 860.

At this point, the input unit 820 is for inputting various data. The microcomputer 810 performs various processing based on data inputted by this input unit 820. The memory 830 is what becomes a work area of the microcomputer 810 and the like. The power supply unit 840 is for generating various power sources used in the electronic equipment 800. The LCD 850 is for outputting various images (characters, icons, graphics and the like) which the electronic equipment displays. The sound output unit 860 is for outputting various sounds (voice, game sounds and the like) which the electronic equipment 800 outputs, and its function may be realized by hardware such as a speaker.

Figure 8A:
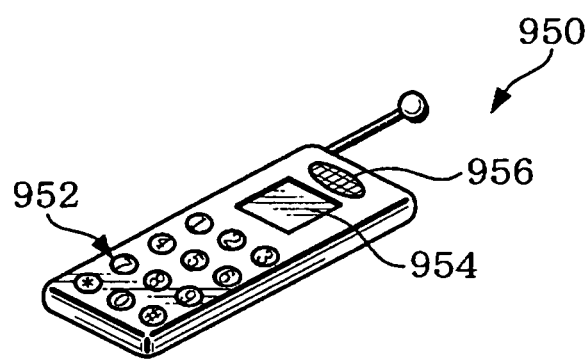
FIGS. 8A, 8B, and 8C are examples of external diagrams of various electronic equipment.
Figure 8B:
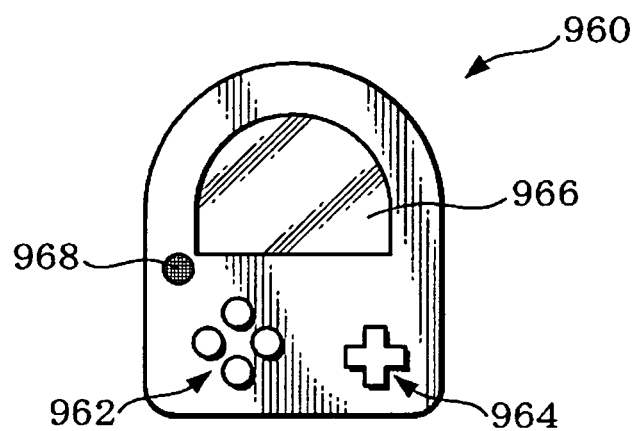
Figure 8C:
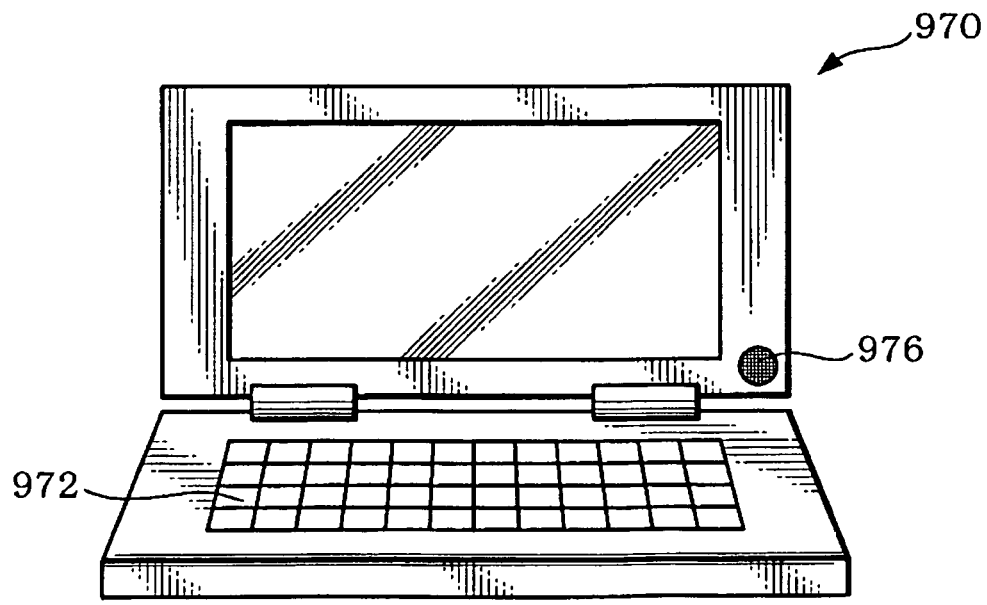

In FIG. 8 A, there is shown an example of a diagram of external appearance of a mobile phone 950, which is one of the electronic equipment. This mobile phone 950 is constituted by dial buttons 952 functioning as the input unit, an LCD 954 displaying telephone numbers, names, icons and the like, and a speaker 956 functioning as a sound output unit and outputting voice.

In FIG. 8 B, there is shown an example of a diagram of external appearance of a portable game machine 960. This portable game machine is constituted by operating buttons 962, a cross key 964, an LCD 966 displaying game images, and a speaker 968 functioning as a sound output unit and outputting game sounds.

In FIG. 8 C, there is shown an example of a diagram of external appearance of a personal computer 970 which is one of the electronic equipment. This personal computer 970 is constituted by a keyboard 972 functioning as an input unit, an LCD 974 displaying characters, numerals, graphics and the like, and a sound output unit 976.

By incorporating a microcomputer of the present embodiment in electronic equipment of FIG. 8 A-FIG. 8 C, it is possible to provide at low cost electronic equipment having fast image processing rates and high cost performance.

It is to be noted that as electronic equipment which can use the present embodiment, in addition to those shown in FIGS. 8 A, B, and C, there may be considered various electronic equipment using LCDs such as portable information terminals, pagers, electronic desktop calculators, apparatus equipped with a touch panel, projectors, word processors, video tape recorders of a view finder type or a see-through monitor type.

It is to be noted that while the present invention is not limited to the present embodiment, various modifications may be effected within the spirit and scope of the present invention.

What is claimed is:

1. An information processing apparatus performing pipeline control, comprising:
    a first fetch cue fetching a non-branch location instruction;
    a second fetch cue fetching a branch instruction;
    a fetch circuit performing arithmetic of a fetch address to fetch an instruction code, fetching the first fetch cue or the second fetch cue, outputting a first fetch cue instruction or a second fetch cue instruction to a decoder circuit;
    a decoder circuit receiving and decoding the instruction code fetched by the first fetch cue or the second fetch cue; and
    an execution circuit executing an instruction based on a decoding result, wherein the fetch circuit includes a selective circuit selecting which instruction for the first fetch cue or the second fetch cue to send to the decoder circuit based on an execution result of a comparison instruction and a decoding result of a branch instruction.

2. The information processing apparatus according to claim 1, wherein the decoder circuit determines whether an instruction subject to decoding is a branch instruction or not, and in a case of the branch instruction, a branch location address of the branch instruction is outputted to the fetch circuit;
    if the instruction subject to decoding is a branch instruction, the fetch circuit fetches the instruction of the branch location address to the second fetch address based on the branch location address received; and
    if the instruction subject to decoding is not a branch instruction, arithmetic is performed on a non-branch location address and an instruction of the non-branch location address is fetched to the first fetch cue based on the non-branch location address.

3. The information processing apparatus according to claim 1, wherein the decoder circuit outputs the branch location address of the branch instruction to the fetch circuit prior to completing decoding the instruction.

4. The information processing apparatus according to claim 1, wherein the fetch circuit fetches simultaneously more than two instructions from consecutive addresses.

5. A microcomputer comprising an information processing apparatus according to claim 1.

6. Electronic equipment comprising: the information processing apparatus according to claim 1; means of receiving input information; and
    means of outputting a result of processing by the information processing apparatus based on the input information.

* * * * *